United States Patent Office 2,824,264
Patented Feb. 18, 1958

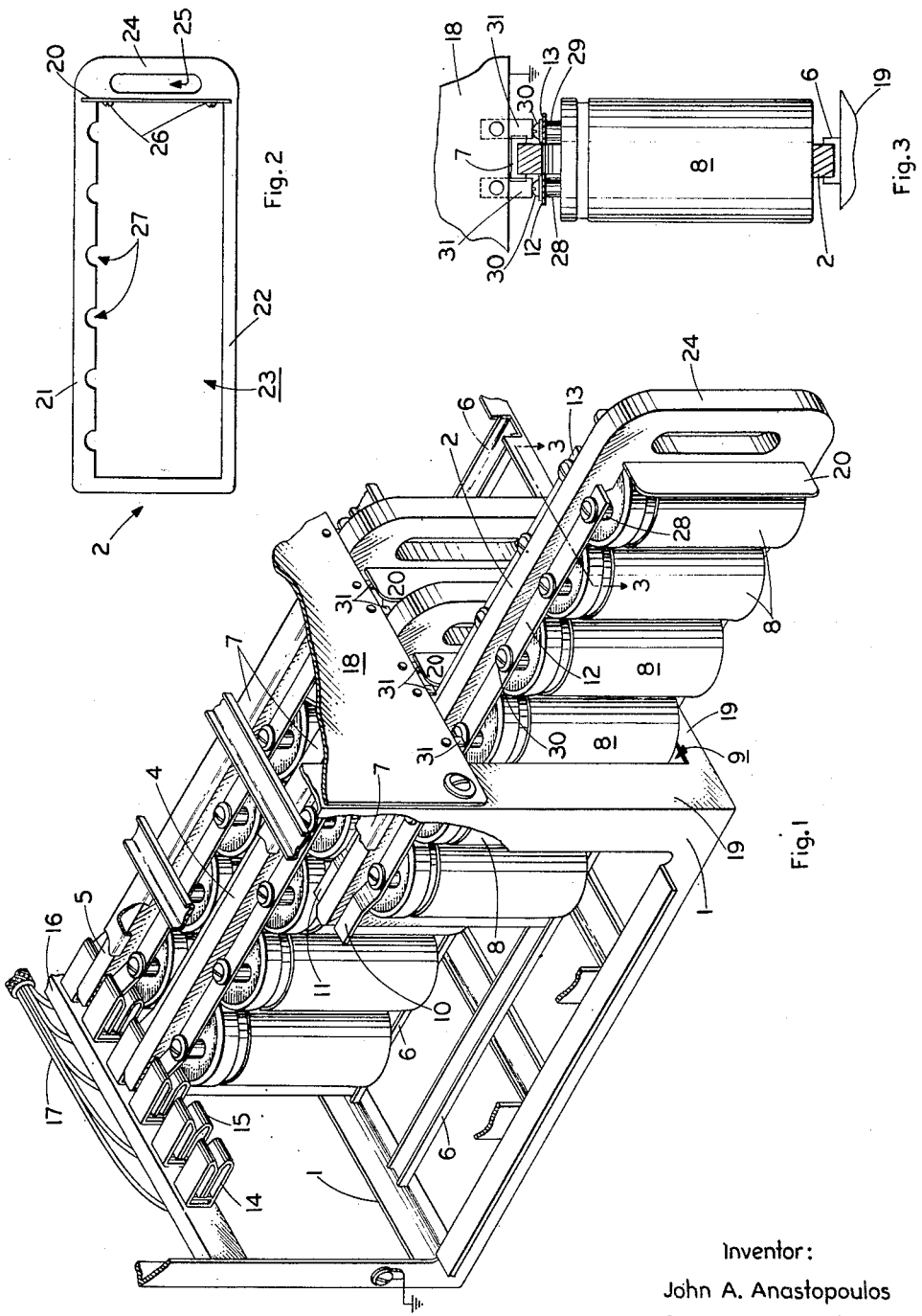

2,824,264

ELECTRICAL CAPACITOR ASSEMBLY

John A. Anastopoulos, Lowell, Mass., assignor to General Electric Company, a corporation of New York Application September 13, 1956, Serial No. 609,585

6 Claims. (Cl. 317—99)

The present invention relates to electrical capacitors and, more particularly, to improved electrolytic capacitor plug-in rack and support assemblies wherein plural circuit couplings and compact physical mountings may be effectuated rapidly and safely.

Equipments for the rectification and filtering of high levels of alternating or fluctuating electric power commonly employ a number of condensers of the electrolytic type which are each usually in the form of a sealed container having insulated terminals connected with plates disposed within the container and cooperating with a liquid or paste electrolyte. While some types and applications of equipment admit of permanent installation of such components individually, as by way of soldered or bolted connections, others must be adapted for periodic preventive or occasional emergency substitutions of capacitors without prolonged interruption of service. In the latter type of equipment it is important that the capacitor banks be readily accessible and that stored charges in them be prevented from reaching operators. Additionally, mounting space must be utilized most effectively where large numbers of capacitors are demanded, and it must be possible to preserve insulation both at high positive voltages and at negative system potentials which may be other than chassis ground potentials.

Thus, it is one of the objects of the present invention to provide an improved capacitor assembly accommodating a plurality of rectifiers within limited space while affording ready access for rapid capacitor replacements and protection against accidental discharges.

It is a further object to provide an improved capacitor assembly of a plug-in type having a particularly simple and inexpensive construction of few parts which maintain optimum electrical contact and insure required insulations.

By way of a summary account of this invention in one of its aspects, I provide a rigid planar insulating member or tray of generally rectangular outline having a substantially rectangular opening or window therethrough, a handle being formed at one of the narrower ends. Disposed in a side-by-side array within the tray opening are at least two generally cylindrical electrolytic capacitors each having a pair of internally-threaded terminals oriented one on each side of the thin tray. A pair of conducting bus bars are disposed one on each side of the tray, with each clamped to the capacitor terminals on its side, as by set screws, and with each projecting out beyond the capacitors at the narrow end opposite the handle. The tray cooperates with a pair of parallel channels mounted on a frame, such that the tray may be slid into the frame and the bus bar ends forced into mating engagement with electrical receptacles mounted on the frame in an insulating relationship. A pair of grounded flexible wipers are also fixed to the frame in position to contact both bus bars whenever these are withdrawn from their mating receptacles.

Although the features of this invention which are believed to be novel are set forth in the appended claims, further details of the invention and the objects and advantages thereof may be readily comprehended through reference to the following description taken in connection with the accompanying drawing, wherein:

Figure 1 represents a pictorial view of a full capacitor assembly in accordance with present teachings, certain portions being broken away to reveal constructional features;

Figure 2 is a side view of a mounting tray such as one of those illustrated in Figure 1; and Figure 3 represents a cross section of an assembly taken along the section line 3—3 in Figure 1.

The arrangement for practicing this invention which is illustrated in Figure 1 comprises a frame or rack 1 having a plurality of insulating trays 2, 4, and 5 disposed therein for sliding movement in the fixed spaced parallel guide channels 6 and 7. Each of these trays is loaded with a number of generally cylindrical electrolytic capacitors, as in the case of the six capacitors identified by reference character 8 cooperating with tray 2. One side of the frame 1 is provided with an opening 9 into which each loaded tray may be inserted by sliding in one pair of the parallel aligned guide chanels 6 and 7 until ends 10 and 11 of bus bars 12 and 13 associated with the capacitor tray engage and are held in firm electrical contact with the mating receptacles or clip terminals 14 and 15, respectively. Bus bars 12 and 13 bring capacitors 8 into parallel circuit relationship, thereby increasing the total capacitance of the assembly, and the terminals such as 14 and 15 on the insulating mounting member 16 couple this capacitance into other circuitry through leads 17. When the trays are fully inserted into frame 1 the capacitors 8 are wholly recessed within it behind the outer panel 18 and outer frame elements 19, such that they are not exposed to operators while at elevated potentials. This is true also of the outer ends of bus bars 12 and 13. Shock hazards are still further reduced by the insulating end shields 20 which aid in closing the frame opening 9. The parallel spaced channels 6 and 7 preserve adjacent trays in a parallel array with small spacings such that the capacitors in adjacent trays do not contact one another, and end shields 20 are dimensioned accordingly to deny accidental access to the capacitors when all trays are recessed in their electrically-operating positions.

Tray 2 is shown in Figure 2 disassociated from capacitors and bus bars. This member may be easily fabricated from sheet insulating board or may be molded directly into the illustrated generally rectangular form. The top and bottom members 21 and 22 which frame the substantially rectangular window or capacitor-receiving opening 23 also serve as slides or guides for insertion of the tray into the channels 6 and 7 in Figure 1. At one end a handle 24 is formed, integrally, with a suitable opening 25 which facilitates manipulation of the tray. Shield 20 is preferably formed as a separate piece and affixed to the tray at the handle end by fasteners 26.

Semi-circular openings 27 communicating with the inner edge of tray member 21 permit the capacitors 8 to be placed within the tray opening 23 without obstruction of the capacitor terminals. It should be noted in this connection that opening 23 is preferably of the same height as the cylindrical body of each of the capacitors 8, whereby the flat inner surfaces of the tray members 21 and 22 tend to hold the capacitors in place without excessive play. However, as appear in Figure 3, the two insulated terminals 28 and 29 projecting upward symmetrically from each of the capacitors 8 are at a greater height than the body of each capacitor, and the semi-circular openings 27 allow one of the terminals of each capacitor to be passed therethrough when capacitors are added to or removed from the tray.

Bus bars 10 and 11 not only serve to couple like terminals of the capacitors together, to form parallel electrical couplings which totalize the capacitances, but also function as mounting elements. The terminals 28 and 29 are of course fixed in position on each capacitor, and the bus bars are in turn fixed to these internally threaded terminals by set screws 30. By dimensioning the bus bars to be of proper width, the thin tray, which is of lesser thickness than the distance between terminals, is fixedly clamped in relation to the capacitors. The view in Figure 3 shows this rigid assembled relationship.

At the end of the tray near handle 24 the bus bars 28 and 29 terminate at a given distance to the rear of the shield 20, for a purpose explained later herein. At their opposite ends, 10 and 11, these bus bars project beyond the capacitors, for coupling with terminal clips 14 and 15, and also are off-set such that the clips will not be short-circuited by contact with the capacitors when the tray has been plugged into the clips. The assembled tray is found to be in a tightly clamped relationship with its capacitors and bus bars when at least two capacitors are in place.

In addition to the aforementioned shield and enclosure for reduction of shock hazards, further protection is provided by the shorting or discharging wipers 31. A pair of such flexible wipers cooperates with each tray and these are preferably mounted in a shorted and grounded relationship on outer panel 18. With a capacitor tray fully plugged in, the cooperating wipers 31 are disposed intermediate the tray shield and the bus bar ends nearer the tray handle, without contacting the bus bars. However, these flexible wipers project down from panel 18 sufficiently to bear against and wipe both bus bars of each tray upon removal of the tray, thereby discharging any stored electrical energy. The portrayal in Figure 3 is that of the wipers as flexed across the terminal set screws 30. In those applications wherein the panel is non-conducting or ungrounded, the wipers in each pair may of course be otherwise electrically interconnected and grounded.

While a preferred embodiment of these teachings has been shown and described, it will occur to those skilled in the art that various changes and modifications may be effected without departing either in spirit or scope from the invention as set forth in the appended claims.

What I claim as new and desire to secure by Letters Patent of the United States is:

1. An assembly for the mounting and electrical connection of a plurality of capacitors each having a body portion of a predetermined height and a pair of spaced electrical terminals projecting beyond said body portion from one end thereof, comprising a flat and substantially rectangular holding tray of insulating material having a substantially rectangular window therethrough, said capacitors being disposed within said tray window each with one of said terminals on one side of said tray and the other of said terminals on the other side of said tray, a pair of elongated conducting bus bars disposed one on each side of said flat tray, means fastening said one terminals to one of said bus bars and the other of said terminals to the other of said bus bars, a support rack including a pair of parallel guide members positioned and shaped to receive edges of said tray and to guide sliding movements of said tray in said rack, and insulated electrical connecting means mounted on said rack to engage and make electrical connection with said bus bars when said tray occupies a predetermined sliding position in said rack.

2. An assembly for the mounting and electrical connection of at least two capacitors each having a body portion of a predetermined height and a pair of spaced electrical terminals projecting beyond said body portion from one end thereof, comprising a substantially rectangular holding tray of insulating material having a substantially rectangular window therethrough, said capacitors being disposed within said tray window each with one of said terminals on one side of said tray and the other of said terminals on the other side of said tray, a pair of elongated conducting bus bars disposed one on each side of said insulating tray and separated thereby, means fastening one of said bus bars to said one terminals and in abutting relationship with one side of said tray and fastening the other of said bus bars to said other terminals and in abutting relationship with the other side of said tray, whereby said capacitors and tray and bus bars are held together, a support rack including a pair of parallel guide means positioned and shaped to receive sides of said tray and to guide sliding movements of said tray in said rack, and electrical connecting means mounted in insulated relationship on said rack to engage and make electrical contact with said bus bars when said tray occupies a predetermined sliding position in said rack.

3. An assembly for the mounting and electrical connection of a plurality of capacitors each having a body portion of a predetermined height and a pair of spaced electrical terminals projecting beyond said body portion from one end thereof, comprising a substantially rectangular holding tray of insulating material having a substantially rectangular window therethrough, said capacitors being disposed within said tray window each with one of said terminals on one side of said tray and the other of said terminals on the other side of said tray, a pair of conducting bus bars disposed one on each side of said insulating tray and separated thereby, means fastening one of said bus bars to said one terminals and the other of said bus bars to said other terminals, a support rack including a pair of parallel guide means positioned and shaped to receive sides of said tray and to guide sliding movements of said tray in said rack, electrical connecting means mounted in insulated relationship on said rack to engage and make electrical contact with said bus bars when said tray occupies a predetermined sliding position in said rack, and electrical shorting means mounted on said rack to make electrical contact with both of said bus bars when said tray is moved out of said predetermined position and to avoid electrical contact with said bus bars when said tray occupies said predetermined position.

4. An assembly for the mounting and electrical connection of a plurality of capacitors each having a body portion of a predetermined height and a pair of spaced electrical terminals projecting beyond said body portion from one end thereof, comprising a flat and substantially rectangular holding tray of insulating material having a substantially rectangular window therethrough with one dimension substantially the same as said capacitor height, said tray having at least one opening communicating with said window and extending in the direction of said one dimension to admit one of said terminals through said tray when one of said capacitors is positioned within said tray window, said capacitors being disposed within said tray window each with one of said terminals on one side of said tray and the other of said terminals on the other side of said tray and each with the body portion thereof parallel with said one dimension, a pair of conducting bus bars disposed one on each side of said insulating tray and separated thereby, means fastening one of said bus bars to said one terminals and the other of said bus bars to said other terminals, said bus bars each having an end extending beyond the body portions of said capacitors at one end of said tray, a support rack including a pair of parallel guide means positioned and shaped to receive sides of said tray and to guide sliding movements of said tray in said rack, and a pair of electrical receptacles each mounted in an insulated relationship on said rack to contact a different one of said bus bar ends when said tray occupies a predetermined sliding position in said rack.

5. An assembly for the mounting and electrical connection of a plurality of capacitors each having a body portion of a predetermined height and a pair of spaced electrical terminals projecting beyond said body portion from one end thereof, comprising a flat and substantially rectangular holding tray of insulating material having a substantially rectangular window therethrough with one dimension substantially the same as said capacitor height and having one end shaped to form a handle for manipulation of said tray, said tray further having a plurality of openings each communicating with said window and extending in the direction of said one dimension to admit one of said terminals through said tray when one of said capacitors is positioned within said tray window, said capacitors being disposed within said tray window each with one of said terminals on one side of said tray and the other of said terminals on the other side of said tray adjacent a different one of said openings and each with the body portion thereof parallel with said one dimension, a pair of conducting bus bars disposed one on each side of said insulating tray and separated thereby, means fastening one of said bus bars to said one terminals and the other of said bus bars to said other terminals, said bus bars each having an end extending beyond the body portions of said capacitors at the tray end opposite said tray handle, a support rack including a pair of parallel guide means positioned and spaced to receive sides of said tray and to guide sliding movements of said tray in said rack, and a pair of electrical receptacles each mounted in an insulated relationship on said rack to contact a different one of said bus bar ends when said tray occupies a predetermined sliding position in said rack.

6. An assembly for the mounting and electrical connection of a plurality of generally cylindrical capacitors each having a body portion of a predetermined height and a pair of spaced internally threaded electrical terminals projecting beyond said body portion from one end thereof, comprising a flat and substantially rectangular holding tray of insulating material having a substantially rectangular window therethrough with one dimension substantially the same as said capacitor height and having one end shaped as an integral handle for said tray, said tray further having a plurality of openings each communicating with said window and extending in the direction of said one dimension to admit one of said terminals through said tray when one of said capacitors is positioned within said tray window, said capacitors being disposed within said tray window each with one of said terminals on one side of said tray and the other of said terminals on the other side of said tray adjacent a different one of said openings and each with the body portion thereof parallel with said one dimension, a pair of bus bars disposed one on each side of said insulating tray and separated thereby and each having an end extending beyond the body portions of said capacitors at the tray end opposite said handle, set screws threaded into said terminals and fastening one of said bus bars with said one terminals and in abutting relationship to one side of said tray and fastening the other of said bus bars to said other terminals in abutting relationship to the other side of said tray, whereby said capacitors and tray and bus bars are held together, an insulating shield fixed with said tray intermediate said handle and said capacitors and bus bars, a support rack having an outer panel and an opening for admitting said tray, a pair of parallel guide channels fixed on said rack to receive edges of said tray and to guide sliding movement of said tray into said rack through said rack opening, a pair of electrical receptacles each mounted in an insulated relationship on said rack to contact a different one of said bus bar ends when said tray is fully recessed in said rack through said rack opening, said shield being dimensioned to close at least part of said rack opening when said tray is fully recessed and thereby to prevent accidental access to said bus bars and capacitors, and grounded electrical shorting means mounted on said rack to make wiping electrical contact with both of said bus bars when said tray is not fully recessed in said rack and to avoid contact with said bus bars when said tray is fully recessed in said rack.

References Cited in the file of this patent

UNITED STATES PATENTS

| | | |
|---|---|---|
| 498,907 | Stanly et al. | June 6, 1893 |
| 554,759 | Willms | Feb. 18, 1896 |
| 705,919 | Gill | July 29, 1902 |
| 954,119 | Mason | Apr. 5, 1910 |
| 1,810,295 | Ritter et al. | June 16, 1931 |
| 1,845,047 | Holland | Feb. 16, 1932 |
| 2,117,692 | Atkins | May 17, 1938 |
| 2,329,856 | Salathe et al. | Sept. 21, 1943 |
| 2,405,139 | Geoghegan | Aug. 6, 1946 |
| 2,467,727 | Brown | Apr. 19, 1949 |
| 2,671,126 | Brennan | Mar. 2, 1954 |

FOREIGN PATENTS

| | | |
|---|---|---|
| 755,627 | Great Britain | Aug. 22, 1956 |